United States Patent
Xu et al.

(10) Patent No.: US 9,880,764 B1
(45) Date of Patent: Jan. 30, 2018

(54) FLASH DISK CACHE MANAGEMENT FOR INCREASED VIRTUAL LUN AVAILABILITY

(71) Applicant: EMC Corporation, Hopkinton, MA (US)

(72) Inventors: Xinlei Xu, Beijing (CN); Jian Gao, Beijing (CN); Lifeng Yang, Beijing (CN); Geng Han, Beijing (CN); Jibing Dong, Beijing (CN); Lili Chen, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 15/085,923

(22) Filed: Mar. 30, 2016

(51) Int. Cl.
   *G06F 12/00* (2006.01)
   *G06F 3/06* (2006.01)
   *G06F 12/0871* (2016.01)

(52) U.S. Cl.
   CPC .......... *G06F 3/0619* (2013.01); *G06F 3/0655* (2013.01); *G06F 3/0665* (2013.01); *G06F 3/0689* (2013.01); *G06F 12/0871* (2013.01); *G06F 2212/222* (2013.01); *G06F 2212/286* (2013.01)

(58) Field of Classification Search
   CPC .... G06F 3/0619; G06F 3/0655; G06F 3/0665; G06F 3/0689; G06F 12/0871; G06F 2212/222; G06F 2212/286
   See application file for complete search history.

(56) References Cited

U.S. PATENT DOCUMENTS

| 2011/0197036 A1* | 8/2011 | Ishii ..................... G06F 12/0866 711/155 |
| 2012/0215970 A1* | 8/2012 | Shats ................... G06F 12/0866 711/103 |

\* cited by examiner

*Primary Examiner* — Matthew Bradley
(74) *Attorney, Agent, or Firm* — BainwoodHuang (57) ABSTRACT

Systems, methods, and computer readable media are disclosed. A map including the number of dirty cache pages stored in the flash disk cache for each VLUN of the plurality of VLUNs on the storage system is maintained, by the storage system. A flash disk cache error requiring the storage system to take the flash disk cache offline is detected. In response to detecting the flash disk cache error a first one or more VLUNs of the plurality of VLUNs with at least one dirty cache page stored in the flash disk cache are identified by the storage system based on the map. The first one or more VLUNs are taken offline by the storage system. The flash disk cache is taken offline by the storage system. A second one or more VLUNs comprising VLUNs of the plurality of VLUNs without dirty cache pages stored in the flash disk cache are maintained online by the storage system.

22 Claims, 6 Drawing Sheets

405 Maintain map including the number of dirty cache pages stored in the flash disk cache for each VLUN 410 Detect flash disk cache error 415 Identifying VLUNs with at least one dirty cache page stored in the flash disk cache.

420 Take identified VLUNs offline.

425 Take flash disk cache offline.

FLASH DISK CACHE MANAGEMENT FOR INCREASED VIRTUAL LUN AVAILABILITY

FIELD OF THE TECHNOLOGY

The present technology relates generally to data storage systems and, more specifically, to improving availability of virtual LUNs in storage systems.

BACKGROUND

In some applications, a storage system can provide storage to a host in the form of a virtual LUN. In general, a virtual can be virtual storage space where physical storage space is provisioned for the virtual LUN on a slice-by-slice basis as physical storage space is actually needed to store data. Beneficially, in some applications, the number and size of virtual LUNs that can be created on a storage system is not constrained by the amount of physical storage on the storage system. Instead, physical storage can be provisioned for the virtual LUNs as needed, and, similarly, physical storage can be added to the storage system as needed after the virtual LUNs are in use.

SUMMARY OF THE TECHNOLOGY

Accordingly, there is a need for improving the availability of virtual LUNs in storage systems. For example, in some applications, flash disk caches can be used with virtual LUNs. In some implementations, the flash disk cache can only track the physical LUN associated with a page in the cache and can be unaware of which virtual LUNs have dirty cache pages in the cache. When the flash disk cache goes offline, some storage systems will take all of the virtual LUNs using the flash disk cache offline. This can be important for virtual LUNs that have dirty cache pages in the cache in order to avoid data loss. However, it may not be necessary to take offline the virtual LUNs that do not have dirty cache pages in the flash disk cache. The technology disclosed herein can improve virtual LUN availability by only taking offline virtual LUNs with dirty cache pages in the flash disk cache.

In one aspect, there is a method performed by a storage system including a flash disk cache and a plurality of virtual LUNs (VLUNs). The method can include maintaining, by the storage system, a map including a number of dirty cache pages stored in the flash disk cache for each VLUN of the plurality of VLUNs on the storage system. The method can include detecting, by the storage system, a flash disk cache error requiring the storage system to take the flash disk cache offline. The method can include, in response to detecting the flash disk cache error, identifying, by the storage system, based on the map a first one or more VLUNs of the plurality of VLUNs with at least one dirty cache page stored in the flash disk cache. The method can include taking offline, by the storage system, the first one or more VLUNs. The method can include taking offline, by the storage system, the flash disk cache. The method can include maintaining online, by the storage system, a second one or more VLUNs including VLUNs of the plurality of VLUNs without dirty cache pages stored in the flash disk cache.

In some embodiments, a VLUN of the second one or more VLUNs has at least one clean cache page in the flash disk cache. In some embodiments, the plurality of VLUNs are thin-provisioned LUNs. In some embodiments, the method includes receiving, by the storage system, a write request including data to write to a first VLUN of the plurality of VLUNs and an identification of the first VLUN; determining, by the storage system, based on the write request there is a cache hit in the flash disk cache, the cache hit for a first cache page in the flash disk cache; determining, by the storage system, the first cache page is clean prior to writing the data to the flash disk cache; determining, by the storage system, the first cache page is dirty as a result of executing the write request; incrementing, by the storage system, the number of dirty cache pages for the first VLUN in the map; and writing, by the storage system, the data to the flash disk cache.

In some embodiments, the method includes identifying, by the storage system, a first cache page in the fast disk cache for eviction; determining, by the storage system, the first cache page is dirty and associated with a first VLUN; writing, by the storage system, data of the first cache page to a physical LUN; and decrementing, by the storage system, the number of dirty cache pages for the first VLUN in the map. In some embodiments, the map includes an entry for each VLUN of the plurality of VLUNs, the entry including a VLUN identifier for the VLUN and an associated number of dirty cache pages stored in the flash disk cache. In some embodiments, the method includes creating, by the storage system, a new VLUN; and in response to creating the new VLUN, creating, by the storage system, a new entry in the map for the new VLUN. In some embodiments, the method includes creating, by the storage system, a new VLUN; receiving, by the storage system, a write request including data to write to the new VLUN; and in response to receiving the write request, creating, by the storage system, a new entry in the map for the new VLUN.

In another aspect, there is a storage system. The storage system includes a plurality of VLUNs; a flash disk cache; and a service processor. The service processor is configured to: maintain a map including a number of dirty cache pages stored in the flash disk cache for each VLUN of the plurality of VLUNs on the storage system; detect a flash disk cache error requiring the storage system to take the flash disk cache offline; in response to detecting the flash disk cache error, identify, based on the map a first one or more VLUNs of the plurality of VLUNs with at least one dirty cache page stored in the flash disk cache; take offline the first one or more VLUNs; take offline the flash disk cache; and maintain online a second one or more VLUNs including VLUNs of the plurality of VLUNs without dirty cache pages stored in the flash disk cache.

In some embodiments, a VLUN of the second one or more VLUNs has at least one clean cache page in the flash disk cache. In some embodiments, the plurality of VLUNs are thin-provisioned LUNs. In some embodiments, the storage processor is further configured to: receive a write request including data to write to a first VLUN of the plurality of VLUNs and an identification of the first VLUN; determine based on the write request there is a cache hit in the flash disk cache, the cache hit for a first cache page in the flash disk cache; determine the first cache page is clean prior to writing the data to the flash disk cache; determine the first cache page is dirty as a result of executing the write request; increment the number of dirty cache pages for the first VLUN in the map; and write the data to the flash disk cache.

In some embodiments, the storage processor is further configured to: identify a first cache page in the fast disk cache for eviction; determine the first cache page is dirty and associated with a first VLUN; write data of the first cache page to a physical LUN; and decrement the number of dirty cache pages for the first VLUN in the map. In some embodiments, the map includes an entry for each VLUN of the plurality of VLUNs, the entry including a VLUN identifier for the VLUN and an associated number of dirty cache pages stored in the flash disk cache. In some embodiments, the storage processor is further configured to: create a new VLUN; and in response to creating the new VLUN, create a new entry in the map for the new VLUN. In some embodiments, the storage processor is further configured to: create a new VLUN; receive a write request including data to write to the new VLUN; and in response to receiving the write request, create a new entry in the map for the new VLUN.

In another aspect there is a computer readable program product embodied in a non-transitory medium storing instructions that, when executed by a storage system, cause the storage system to: maintain a map including a number of dirty cache pages stored in a flash disk cache for each VLUN of a plurality of VLUNs on the storage system; detect a flash disk cache error requiring the storage system to take the flash disk cache offline; in response to detecting the flash disk cache error, identify, based on the map a first one or more VLUNs of the plurality of VLUNs with at least one dirty cache page stored in the flash disk cache; take offline the first one or more VLUNs; take offline the flash disk cache; and maintain online a second one or more VLUNs including VLUNs of the plurality of VLUNs without dirty cache pages stored in the flash disk cache.

In some embodiments, the computer readable program stores instructions that cause the storage system to: receive a write request including data to write to a first VLUN of the plurality of VLUNs and an identification of the first VLUN; determine based on the write request there is a cache hit in the flash disk cache, the cache hit for a first cache page in the flash disk cache; determine the first cache page is clean prior to writing the data to the flash disk cache; determine the first cache page is dirty as a result of executing the write request; increment the number of dirty cache pages for the first VLUN in the map; and write the data to the flash disk cache.

In some embodiments, the computer readable program stores instructions that cause the storage system to: identify a first cache page in the fast disk cache for eviction; determine the first cache page is dirty and associated with a first VLUN; write data of the first cache page to a physical LUN; and decrement the number of dirty cache pages for the first VLUN in the map.

In some embodiments, the map includes an entry for each VLUN of the plurality of VLUNs, the entry including a VLUN identifier for the VLUN and an associated number of dirty cache pages stored in the flash disk cache. In some embodiments, the computer readable program stores instructions that cause the storage system to: create a new VLUN; and in response to creating the new VLUN, create a new entry in the map for the new VLUN. In some embodiments, the computer readable program stores instructions that cause the storage system to: create a new VLUN; receive a write request including data to write to the new VLUN; and in response to receiving the write request, create a new entry in the map for the new VLUN.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The technology described herein can facilitate increasing the availability of virtual LUNs on storage systems using flash disk caches by limiting the number of virtual LUNs taken offline in response to an error on the flash disk cache. For example, the technology can determine which VLUNs have data in dirty cache pages on the flash disk cache and only take down those VLUNs in response to an error on the flash disk cached. In accordance with embodiments of the technology, I/O requests passed to the flash disk cache can include an identification of the virtual LUN to which the I/O request relates allowing the flash disk cache to associate cache pages in the cache with particular virtual LUNs. In an exemplary application, a storage system utilizes a flash disk cache to improve the performance of a plurality of VLUNs on the storage system. The storage system can maintain a map of the the number of dirty cache pages stored in the flash disk cache for each VLUN. When the storage system detects a flash disk cache error that requires the flash disk cache to be taken offline, the storage system can identify only those VLUNs with at least one dirty cache page stored in the flash disk cache and take them offline. The storage system can keep the remaining VLUNs online. Beneficially, the technology permits the remaining VLUNs to continue to service I/O requests after the flash disk is taken offline.

Exemplary Storage System Environment

Figure 1:
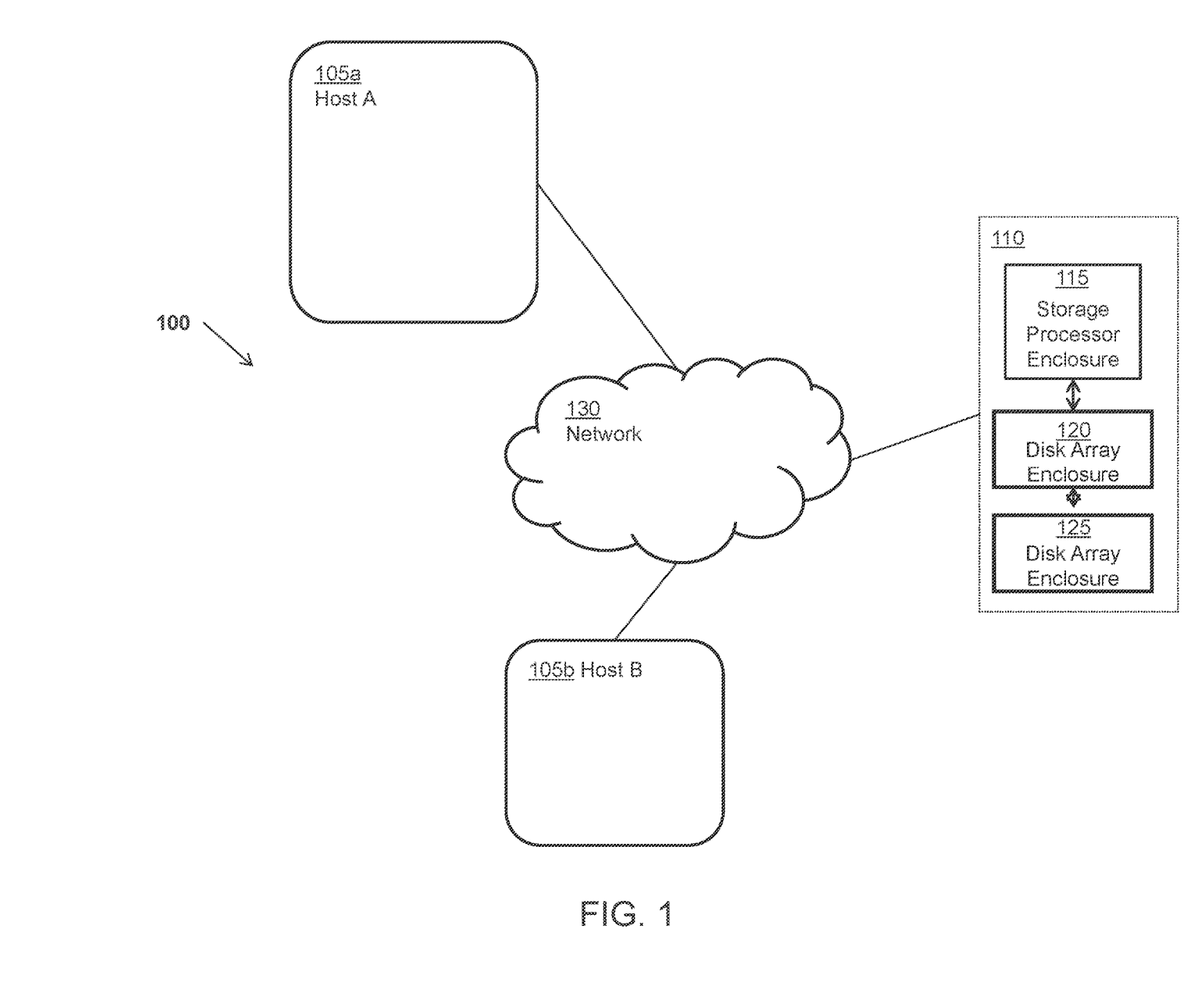
FIG. 1 depicts a system in which the technology can operate.

FIG. 1 depicts system 100 in which the technology can operate. System 100 includes host 105a and host 105b. Host 105a and host 105b can each be a computing device. Storage system 110 includes storage processor enclosure 115. Storage processor enclosure 115 can include one or more storage processors (not shown). The storage processors can be any computing devices, such as servers, blade servers, etc. Storage system 110 includes disk array enclosure 120 and disk array enclosure 125. Disk array enclosures 120 and 125 can include any form of storage devices, such as magnetic disk drives, flash memory drives, SSDs, etc. In the illustrated embodiment, storage processor enclosure 115 is connected to disk array enclosure 120, which is connected to disk array enclosure 125. The storage processors can read data from and write data to the storage devices in disk array enclosure 120 and disk array enclosure 125. Host 105a and host 105b can be connected to storage system 110 via network 130. The illustrated connections can each be any type of connection for communicating data. In general, the storage processors in storage processor enclosure 120 can service I/O requests (e.g., commands to read data from or write data to storage system 110) received from host 105a and host 105b.

It should be appreciated that system 100 is an exemplary system in accordance with the technology. Other configurations are contemplated. For example, in some embodiments, the storage processors and disk enclosures can be in the same or different enclosures. In some embodiments, more or fewer disk array enclosures can be connected to the storage processors in the storage processor enclosure.

Figure 2:
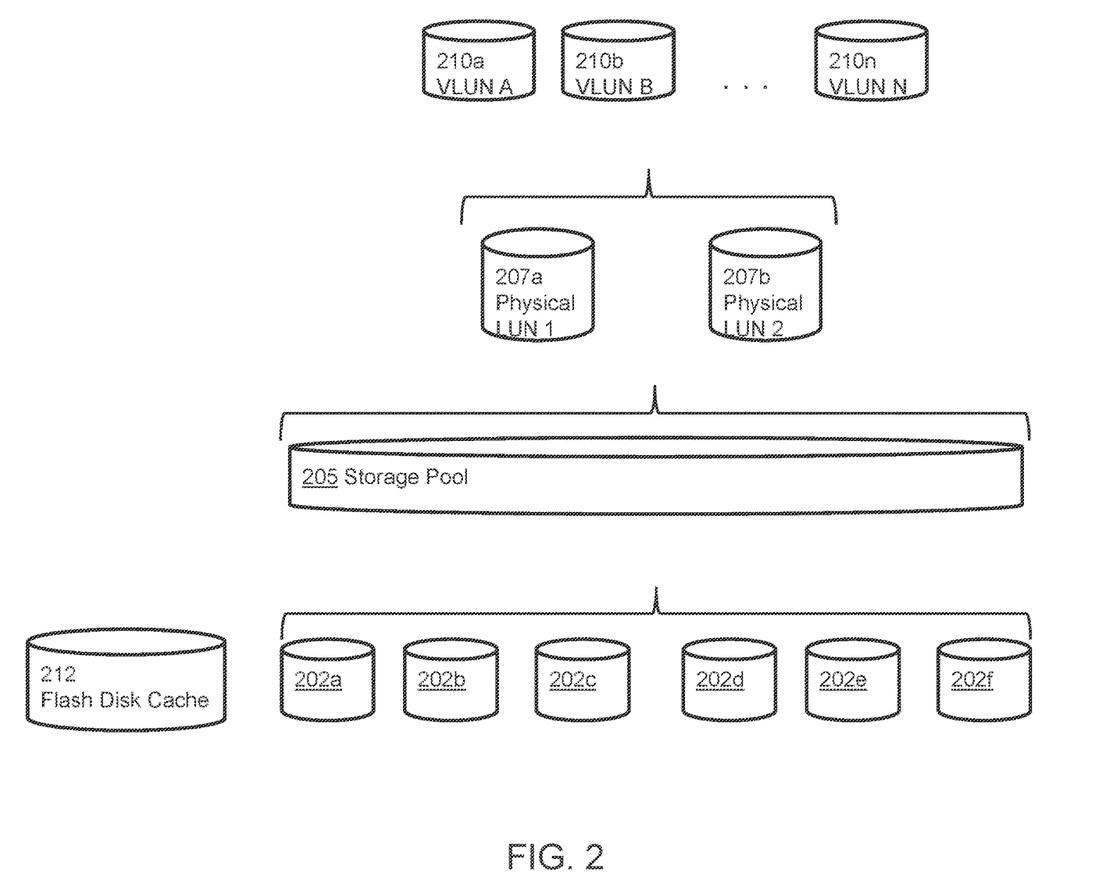
FIG. 2 depicts an exemplary logical relationship between hardware storage devices, a storage pool, physical LUNs, virtual LUNs, and a flash disk cache.

FIG. 2 depicts an exemplary logical relationship between hardware storage devices 202a-202f, storage pool 205, physical LUNs 207a and 207b, virtual LUNs 210a-215n, and flash disk cache 212. The illustrated logical relationship can be used to provide virtual LUNs, such as thin-provisioned LUNs, in a storage system. For example, storage devices 202a-202f can be located in disk array enclosure 120 and/or disk array enclosure 125 of storage system 110. Storage system 110 can include hardware, firmware, and/or software to implement the illustrated logical relationships. As illustrated in FIG. 2, storage pool 205 can be formed from hardware storage devices 202a-202f (e.g., physical storage devices). For example, the storage space of one or more of hardware storage devices 202a-202f can be added to storage pool 205, making the storage space from one or more of hardware storage devices 202a-202f available to be provisioned from storage pool 205. Physical LUNs 207a and 207b can be formed on storage pool 205. For example, a portion of the storage space from storage pool 205 (which in turn is physical storage space from one or more of hardware storage devices 202a-202f) can be provisioned and/or assigned to physical LUN 207a and a portion of the storage space from storage pool 205 (which in turn is storage space from one or more of hardware storage devices 202a-202f) can be provisioned and/or assigned to physical LUN 207b. Generally, physical storage space for the entire capacity of the physical LUN is provisioned at the time the physical LUN is created.

Virtual LUNs 210a-210n can be created on physical LUNs 207a and 207b. As data is written to a virtual LUN, slices of physical storage space on physical LUN 207a or physical LUN 207b are provisioned to store the data. In this manner, physical storage space is provisioned to a virtual LUN as needed. Virtual LUNs can be used for thin provisioning and can be referred to as thin-provisioned LUN or thin LUN. In operation, portions of the storage space from one or more of LUNs 207a and 207b can be provisioned to virtual LUNs 210a-210n. For example, portions of physical LUN 207a can be provisioned to virtual LUN 210a and virtual LUN 210b. Portions of physical LUN 207b can be provisioned to virtual LUN 210n. Storage system 110 can maintain logical mappings between the address spaces of virtual LUNs 210a-210n, physical LUNs 207a and 207b, and storage devices 202a-202f.

Flash disk cache 212 can be one or more storage devices located in disk array enclosure 120 and/or disk array enclosure 125 of storage system 110. Flash disk cache 212 can be formed of one or more flash memory drives, SSDs, or other hardware storage devices with better performance than magnetic disk drives. Flash disk cache 212 can cache some pages of data intended for storage on physical LUN 207a and/or physical LUN 207b to accelerate reading and/or writing data. In some embodiments, the cached pages can be managed (e.g., ordered and/or retained or evicted) by their recency.

It should be appreciated that logical relationships illustrated in FIG. 2 are exemplary logical relationships in accordance with the technology. Other relationships are contemplated. For example, one or more additional layers of virtualization and/or abstraction can be utilized.

Flash Disk Cache Management

Figure 3:
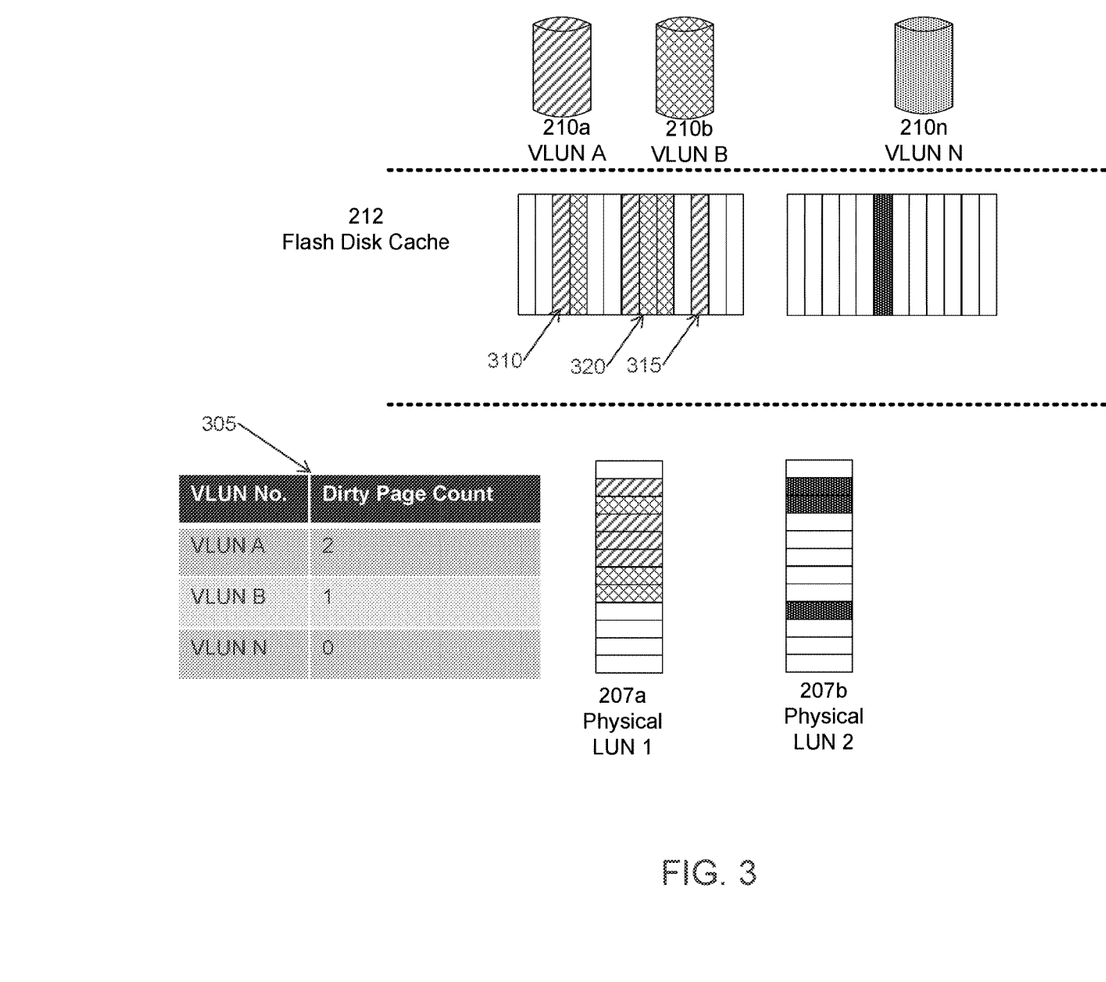
FIG. 3 illustrates an exemplary implementation of the technology on a storage system.

FIG. 3 illustrates an exemplary implementation of the technology on storage system 110. As illustrated, data written to virtual LUNs 210a-210n are stored on physical LUN 207a and physical LUN 207b and/or flash disk cache 212. The number of dirty cache pages for each of virtual LUNs 210a-210n is stored in map 305. In the illustrated embodiment, "dirty" can refer to data written in flash disk cache 212 that has not yet been written to the physical storage of physical LUN 207a or physical LUN 207b. "Clean" can refer to data written in flash disk cache 212 that has been written to the physical storage of physical LUN 207a or physical LUN 207b. For example, map 305 indicates two cache pages stored in flash disk cache 212 for virtual LUN 210a are dirty (e.g., pages 310 and 315). Map 305 indicates one cache page stored in flash disk cache 212 for virtual LUN 210b is dirty (e.g., page 320). Map 305 indicates no cache page stored in flash disk cache 212 for virtual LUN 210n is dirty. As illustrated, the remaining cache pages stored in flash disk cache 212 are clean.

Figure 4:
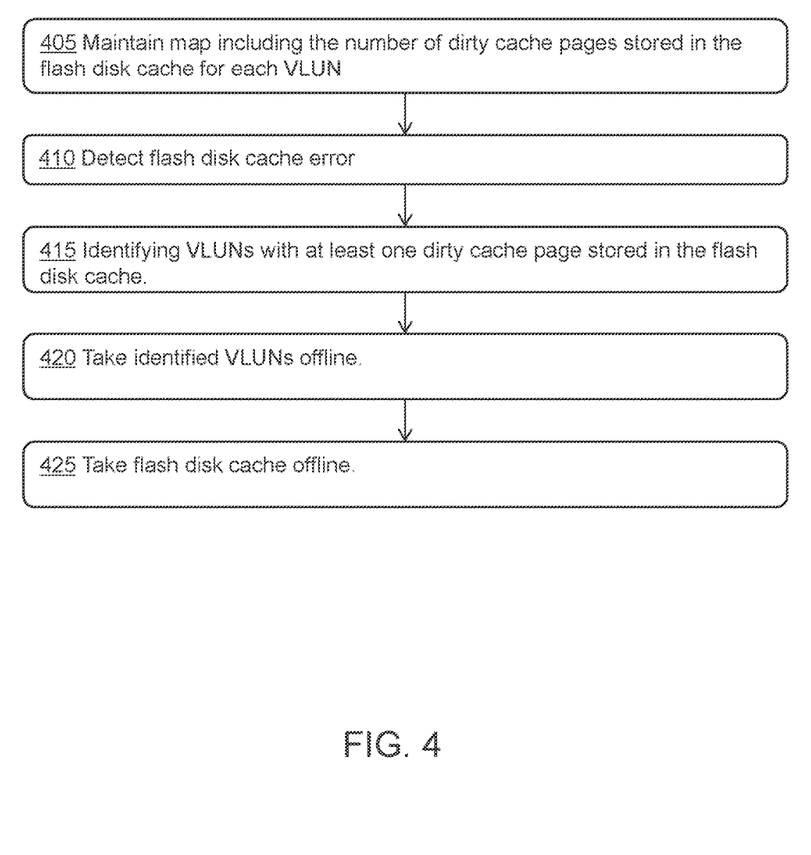
FIG. 4 is a flow chart illustrating a method of managing a flash disk cache in accordance with the present technology.

FIG. 4 is flow chart 400 illustrating a method of managing flash disk cache 212 in accordance with the present technology. At step 405, storage system 110 maintains map 305 including the number of dirty cache pages stored in flash disk cache 212 for each of virtual LUNs 210a, 210b, and 210n. Maintaining map 305 can include storing map 305 and updating map 305 so that it is current. Exemplary methods of maintaining map 305 are discussed with respect to FIGS. 5 and 6. As described above, map 305 indicates the number of dirty cache pages for each of virtual LUNs 210a, 210b, and 210n. At step 410, storage system 110 detects a flash disk cache error requiring flash disk cache 212 to be taken offline. The flash disk error can be, for example, a hardware or software failure associated with the flash disk error. At step 415, storage system 110 identifies the virtual LUNs with at least one dirty cache page stored in flash disk cache 212. Storage system 110 can identify the LUNs based on map 305. For example, as shown in map 305, virtual LUN 210a and virtual LUN 210b each have at least one dirty cache page in flash disk cache 212. At step 420, the storage system takes virtual LUN 210a and virtual LUN 210b offline, as storage system 110 identified them as having dirty cache pages in flash disk cache 212. At step 425, storage system 110 takes flash disk cache 425 offline. For example, flash disk cache 425 can be taken offline to address the detected flash disk cache error. Beneficially, the remaining virtual LUNs can remain online to service I/O requests. For example, virtual LUN 210n can remain online.

Figure 5:
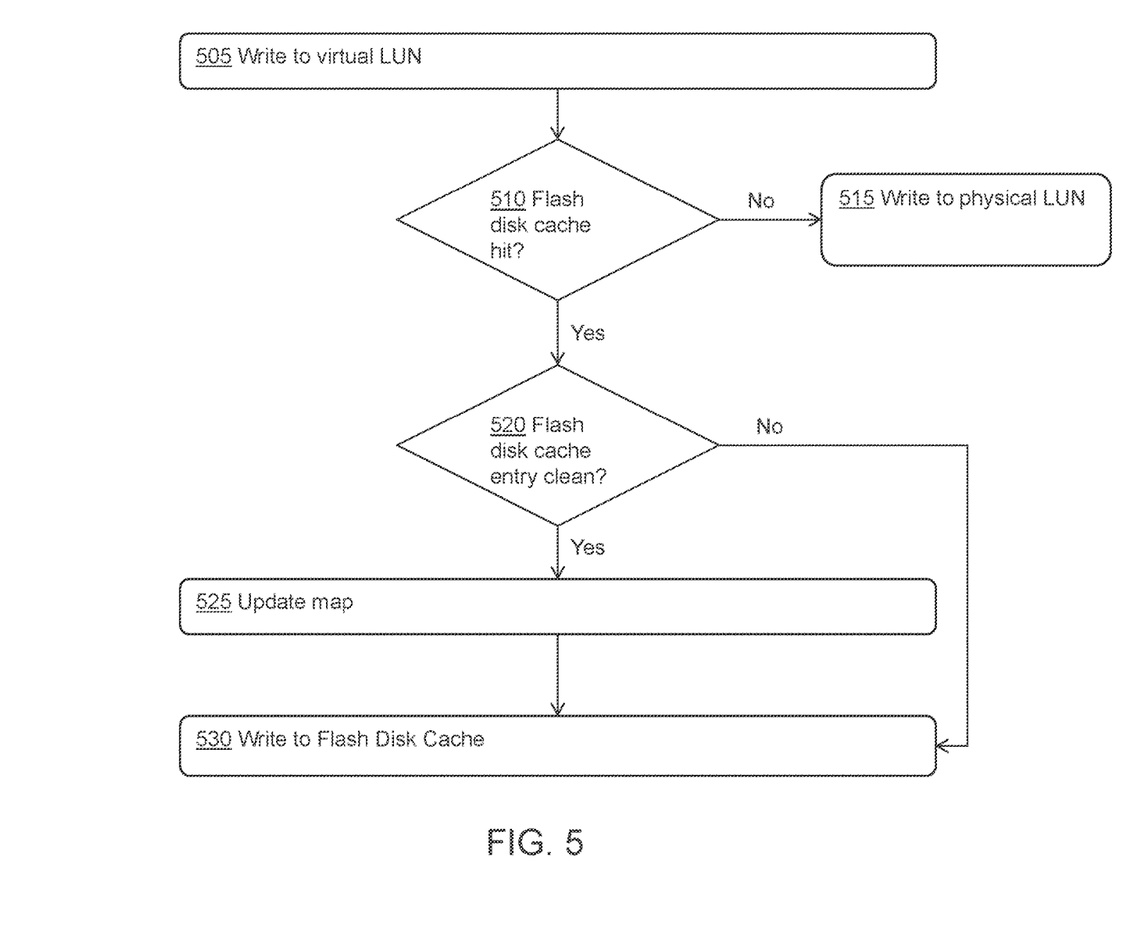
FIG. 5 is a flow chart illustrating a method of updating a map in response to write requests.

FIG. 5 is flow chart 500 illustrating a method of updating map 305 in response to write requests. At step 505, storage system 110 receives a write request including data to write to a virtual LUN, e.g., virtual LUN 210a. At step 510, storage system 110 determines whether there is a cache hit for the data. For example, the storage system 110 can determine whether the data is to be written to one of the cache pages stored in flash disk cache 212 for virtual LUN 210a. If so, the cache page constitutes a cache hit. If there is no cache hit, the method proceeds to step 515. At step 515, the storage system writes the data to appropriate physical LUN. If there is a cache hit, the method proceeds to step 520. At step 520, storage system 110 determines whether the cache page associated with the cache hit is dirty. If the cache page is not dirty, the method proceeds to step 530. If the cache page associated with the cache hit is clean, the method proceeds to step 525. At step 525, storage system updates map 305. For example, if the clean data in the cache page is to be overwritten with different data included in the write request, storage system 110 increments the number of dirty cache pages map 305 indicates for virtual LUN 210a. At step 530, storage system 110 writes the data included in the write request (or a portion thereof) to flash disk cache 212.

Figure 6:
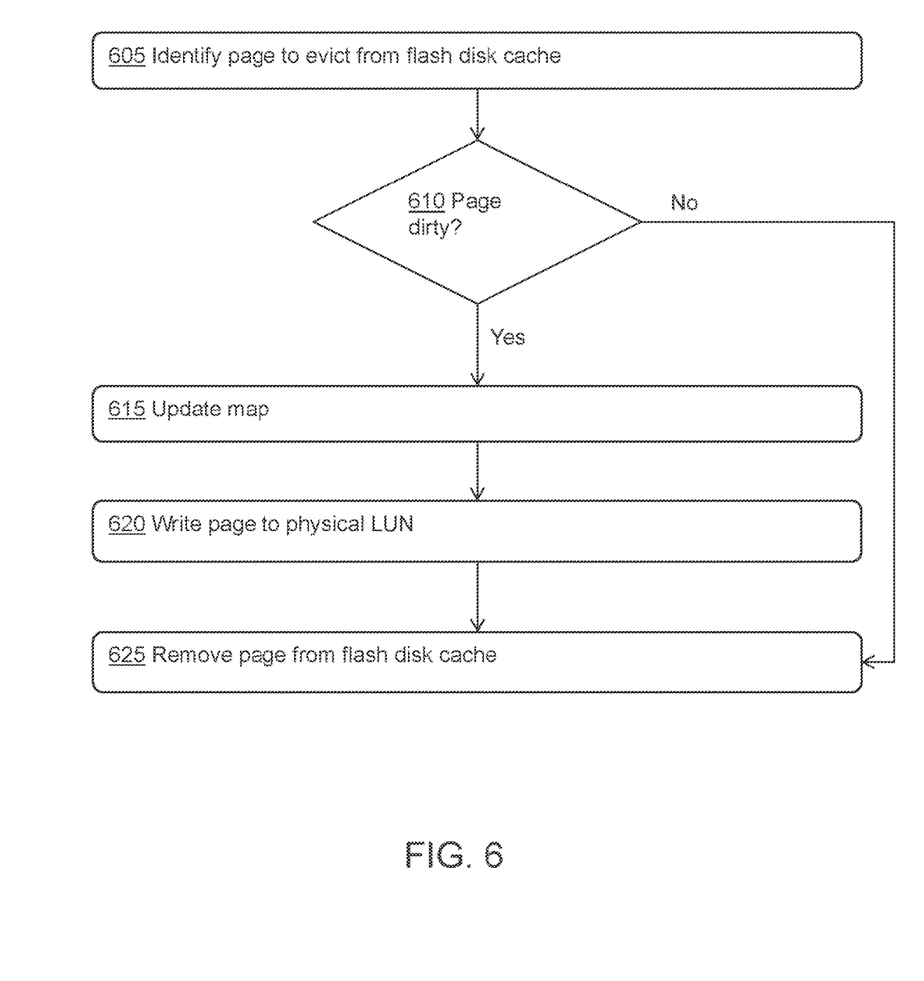
FIG. 6 is a flow chart illustrating a method of updating a map in connection with evicting a cache page from a flash disk cache.

FIG. 6 is flow chart 600 illustrating a method of updating map 305 in connection with evicting a cache page from flash disk cache 212. At step 605, storage system 110 identifies a cache page to evict from flash cache disk 212. At step 610, storage system 110 determines whether the cache page is dirty. If the cache page is not dirty, the method proceeds to step 625. If the cache page is dirty, the method proceeds to step 615. At step 615, storage system 110 updates map 305. For example, if the cache page being evicted is cache page 310 for virtual LUN 210a, storage system 110 decrements the number of dirty cache pages map 305 indicates for virtual LUN 210a. At step 620, storage system 110 writes the data from the evicted cache page to the appropriate physical LUN. At step 625, storage system 110 removes the evicted cache page from flash disk cache 212. It should be appreciated that storage system 110 can perform similar steps to update map 305 during other operation on flash disk cache 212, such as when dirty cache pages in flash disk cache 212 are flushed to the appropriate physical LUNs. Storage system 110 can decrement the counts in map 305 to reflect the reduction of dirty cache pages in flash disk cache 212.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A method performed by a storage system comprising a flash disk cache and a plurality of virtual LUNs (VLUNs), the method comprising:
    maintaining, by the storage system, a map comprising a number of dirty cache pages stored in the flash disk cache for each VLUN of the plurality of VLUNs on the storage system;
    detecting, by the storage system, a flash disk cache error requiring the storage system to take the flash disk cache offline;
    in response to detecting the flash disk cache error, identifying, by the storage system, based on the map a first one or more VLUNs of the plurality of VLUNs with at least one dirty cache page stored in the flash disk cache;
    taking offline, by the storage system, the first one or more VLUNs;
    taking offline, by the storage system, the flash disk cache; and
    maintaining online, by the storage system, a second one or more VLUNs comprising VLUNs of the plurality of VLUNs without dirty cache pages stored in the flash disk cache.

2. The method of claim 1, wherein a VLUN of the second one or more VLUNs has at least one clean cache page in the flash disk cache.

3. The method of claim 1, wherein the plurality of VLUNs are thin-provisioned LUNs.

4. The method of claim 1, further comprising:
    receiving, by the storage system, a write request comprising data to write to a first VLUN of the plurality of VLUNs and an identification of the first VLUN;
    determining, by the storage system, based on the write request there is a cache hit in the flash disk cache, the cache hit for a first cache page in the flash disk cache;
    determining, by the storage system, the first cache page is clean prior to writing the data to the flash disk cache;
    determining, by the storage system, the first cache page is dirty as a result of executing the write request;
    incrementing, by the storage system, the number of dirty cache pages for the first VLUN in the map; and
    writing, by the storage system, the data to the flash disk cache.

5. The method of claim 1, further comprising:
    identifying, by the storage system, a first cache page in the fast disk cache for eviction;
    determining, by the storage system, the first cache page is dirty and associated with a first VLUN;
    writing, by the storage system, data of the first cache page to a physical LUN; and
    decrementing, by the storage system, the number of dirty cache pages for the first VLUN in the map.

6. The method of claim 1, wherein the map comprises an entry for each VLUN of the plurality of VLUNs, the entry comprising a VLUN identifier for the VLUN and an associated number of dirty cache pages stored in the flash disk cache.

7. The method of claim 6, further comprising:
    creating, by the storage system, a new VLUN; and
    in response to creating the new VLUN, creating, by the storage system, a new entry in the map for the new VLUN.

8. The method of claim 6, further comprising:
    creating, by the storage system, a new VLUN;
    receiving, by the storage system, a write request comprising data to write to the new VLUN;
    in response to receiving the write request, creating, by the storage system, a new entry in the map for the new VLUN.

9. A storage system comprising:
    a plurality of virtual LUNs (VLUNs);
    a flash disk cache;
    a service processor configured to:
        maintain a map comprising a number of dirty cache pages stored in the flash disk cache for each VLUN of the plurality of VLUNs on the storage system;
        detect a flash disk cache error requiring the storage system to take the flash disk cache offline;
        in response to detecting the flash disk cache error, identify, based on the map a first one or more VLUNs of the plurality of VLUNs with at least one dirty cache page stored in the flash disk cache;
        take offline the first one or more VLUNs;
        take offline the flash disk cache; and
        maintain online a second one or more VLUNs comprising VLUNs of the plurality of VLUNs without dirty cache pages stored in the flash disk cache.

10. The storage system of claim 9, wherein a VLUN of the second one or more VLUNs has at least one clean cache page in the flash disk cache.

11. The storage system of claim 9, wherein the plurality of VLUNs are thin-provisioned LUNs.

12. The storage system of claim 9, wherein the storage processor is further configured to:
    receive a write request comprising data to write to a first VLUN of the plurality of VLUNs and an identification of the first VLUN;

determine based on the write request there is a cache hit in the flash disk cache, the cache hit for a first cache page in the flash disk cache;

determine the first cache page is clean prior to writing the data to the flash disk cache;

determine the first cache page is dirty as a result of executing the write request;

increment the number of dirty cache pages for the first VLUN in the map; and write the data to the flash disk cache.

13. The storage system of claim 9, wherein the storage processor is further configured to:

identify a first cache page in the fast disk cache for eviction;

determine the first cache page is dirty and associated with a first VLUN;

write data of the first cache page to a physical LUN; and decrement the number of dirty cache pages for the first VLUN in the map.

14. The storage system of claim 9, wherein the map comprises an entry for each VLUN of the plurality of VLUNs, the entry comprising a VLUN identifier for the VLUN and an associated number of dirty cache pages stored in the flash disk cache.

15. The storage system of claim 14, wherein the storage processor is further configured to:

create a new VLUN; and in response to creating the new VLUN, create a new entry in the map for the new VLUN.

16. The storage system of claim 14, wherein the storage processor is further configured to:

create a new VLUN;

receive a write request comprising data to write to the new VLUN;

in response to receiving the write request, create a new entry in the map for the new VLUN.

17. A computer readable program product embodied in a non-transitory medium storing instructions that, when executed by a storage system, cause the storage system to:

maintain a map comprising a number of dirty cache pages stored in a flash disk cache for each virtual LUN (VLUN) of a plurality of VLUNs on the storage system;

detect a flash disk cache error requiring the storage system to take the flash disk cache offline;

in response to detecting the flash disk cache error, identify, based on the map a first one or more VLUNs of the plurality of VLUNs with at least one dirty cache page stored in the flash disk cache;

take offline the first one or more VLUNs;

take offline the flash disk cache; and maintain online a second one or more VLUNs comprising VLUNs of the plurality of VLUNs without dirty cache pages stored in the flash disk cache.

18. The computer readable program product of claim 17, further storing instructions that cause the storage system to:

receive a write request comprising data to write to a first VLUN of the plurality of VLUNs and an identification of the first VLUN;

determine based on the write request there is a cache hit in the flash disk cache, the cache hit for a first cache page in the flash disk cache;

determine the first cache page is clean prior to writing the data to the flash disk cache;

determine the first cache page is dirty as a result of executing the write request;

increment the number of dirty cache pages for the first VLUN in the map; and write the data to the flash disk cache.

19. The computer readable program product of claim 17, further storing instructions that cause the storage system to:

identify a first cache page in the fast disk cache for eviction;

determine the first cache page is dirty and associated with a first VLUN;

write data of the first cache page to a physical LUN; and decrement the number of dirty cache pages for the first VLUN in the map.

20. The computer readable program product of claim 17, wherein the map comprises an entry for each VLUN of the plurality of VLUNs, the entry comprising a VLUN identifier for the VLUN and an associated number of dirty cache pages stored in the flash disk cache.

21. The computer readable program product of claim 20, further storing instructions that cause the storage system to:

create a new VLUN; and in response to creating the new VLUN, create a new entry in the map for the new VLUN.

22. The computer readable program product of claim 20, further storing instructions that cause the storage system to:

create a new VLUN;

receive a write request comprising data to write to the new VLUN;

in response to receiving the write request, create a new entry in the map for the new VLUN.

* * * * *